United States Patent
Smith et al.

(10) Patent No.: US 8,423,640 B1
(45) Date of Patent: *Apr. 16, 2013

(54) SYSTEMS AND METHODS FOR DETECTING CLICK SPAM

(75) Inventors: Ben Smith, Mountain View, CA (US); Chad Lester, Redwood City, CA (US); Edward Lyle Karrels, Mountain View, CA (US)

(73) Assignee: Google Inc., Mountain View, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 13/052,941

(22) Filed: Mar. 21, 2011

Related U.S. Application Data

(63) Continuation of application No. 10/608,550, filed on Jun. 30, 2003, now Pat. No. 7,933,984.

(51) Int. Cl.
*G06F 15/173* (2006.01)

(52) U.S. Cl.
USPC .......................................... 709/224; 709/223

(58) Field of Classification Search ............... 709/224, 709/223
See application file for complete search history.

(56) References Cited

U.S. PATENT DOCUMENTS

| | | | |
|---|---|---|---|
| 6,421,675 | B1 | 7/2002 | Ryan et al. |
| 6,661,431 | B1 | 12/2003 | Stuart et al. |
| 7,020,622 | B1 | 3/2006 | Messer |
| 7,100,111 | B2 | 8/2006 | McElfresh et al. |
| 2001/0037314 | A1 | 11/2001 | Ishikawa |
| 2001/0054029 | A1 | 12/2001 | Williams |
| 2002/0042738 | A1 | 4/2002 | Srinivasan et al. |
| 2002/0161648 | A1* | 10/2002 | Mason et al. ............... 705/14 |
| 2004/0254813 | A1 | 12/2004 | Messer |

OTHER PUBLICATIONS

Co-pending U.S. Appl. No. 10/608,550, filed Jun. 30, 2003 entitled "Systems and Methods for Detecting Click Spam" by Ben Smith et al., 29 pages.

* cited by examiner

*Primary Examiner* — Dustin Nguyen
*Assistant Examiner* — Joel Mesa
(74) *Attorney, Agent, or Firm* — Harrity & Harrity, LLP

(57) ABSTRACT

A system detects spamming. The system identifies normal users visiting a web site and determines an occurrence of spamming on the web site based at least in part on the identified normal users.

20 Claims, 4 Drawing Sheets

SYSTEMS AND METHODS FOR DETECTING CLICK SPAM

RELATED APPLICATION

This application is a continuation of application Ser. No. 10/608,550, filed Jun. 30, 2003, the disclosure of which is incorporated herein by reference.

FIELD OF THE INVENTION

The present invention relates generally to communication systems and, more particularly, to detecting click spam in communication systems.

BACKGROUND OF THE INVENTION

Networks, such as the Internet, have become an increasingly important part of our everyday lives. Millions of people now access the Internet on a daily basis to shop for goods and services, obtain information of interest (e.g., movie listings), and to communicate with friends, family, and co-workers (e.g., via e-mail).

Currently, when a person wishes to purchase a product or simply find information on the Internet, the person enters into his/her web browser a Uniform Resource Locator (URL) pertaining to a web site of interest in order to access that particular web site. The person then determines whether the information of interest is available at that particular web site.

For example, suppose an individual wishes to purchase a printer via the Internet. The individual accesses the Internet and types in a vendor's URL. The individual may then access that vendor's home page to determine whether the vendor has the product that this individual wishes to purchase.

If the individual is not aware which vendors sell printers, the individual may access a web site that includes a conventional search engine. The individual enters the generic term "printer" into the search engine to attempt to locate a vendor that sells printers. Using a search engine in this manner to locate individual web sites that offer the desired product or service often results in a list of hundreds or even thousands of "hits," where each hit may correspond to a web page that relates to the search term.

In addition, the search engine web site may provide companies' advertisements relating to the product or service to which the individual is interested. For the example above, the search engine web site may provide advertisements for printers. The search engine web site may charge companies a predetermined fee each time the companies' advertisements are displayed to a user of the search engine web site. A more recent trend is to charge companies a fee each time their advertisement is selected by a user (i.e., each time a user clicks on the displayed advertisement).

This latter fee approach, however, is vulnerable to click spam attacks where malicious individuals (or competitors) inflate a company's click count by, for example, continually physically clicking on the company's advertisement or writing programs that automatically access (although these programs do not necessarily "click" the advertisement, "clicking" hereinafter generally refers to physical clicking of an advertisement, as well as programs that automatically access an advertisement) the company's advertisement. That is, a company may be charged for clicks that do not correspond to real (or normal) users. This often results in the company having to unnecessarily pay more.

Current attempts to detect click spamming rely on identifying the click spammers. As click spamming techniques become more sophisticated, it becomes more difficult to identify these malicious individuals.

Therefore, there exists a need for systems and methods for improving the detection of click spam attacks.

SUMMARY OF THE INVENTION

Implementations consistent with the principles of the invention detect click spam attacks based at least in part on the behavioral patterns of identified normal users.

In accordance with one implementation consistent with the principles of the invention, a method for detecting spam is provided. The method includes identifying normal users visiting a web site and determining an occurrence of spamming on the web site based at least in part on the identified normal users.

In another implementation consistent with the principles of the invention, a method for determining whether an item on a web site has been click spammed is provided. The method includes identifying a group of normal users visiting the web site, determining a click rate of the item for the group of normal users, and determining whether the item has been click spammed based at least in part on the determined click rate for the normal users.

In a further implementation consistent with the principles of the invention, a server includes a processor and a memory configured to store at least one item. The processor is configured to cause the at least one item to be displayed, identify a number of normal users accessing the server, compare the number of normal users to a total number of users to obtain a percentage, set the percentage as a click rate of the at least one item for the normal users, and determine whether the at least one item has been spammed based at least in part on the click rate.

In yet another implementation consistent with the principles of the invention, a method for identifying normal users visiting a web site is provided. The method includes tracking activities of users visiting the web site, where the tracking includes determining, for each user, at least one of whether the user loads images, an age of a cookie associated with each user, whether the user has javascript turned on, a type of browser used by the user, and an interval at which the user visits the web site. The method further includes identifying normal users based at least in part on the tracked activities.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention detect the spamming of advertisements based on a click rate of the advertisements by normal users.

Exemplary Network

Figure 1:
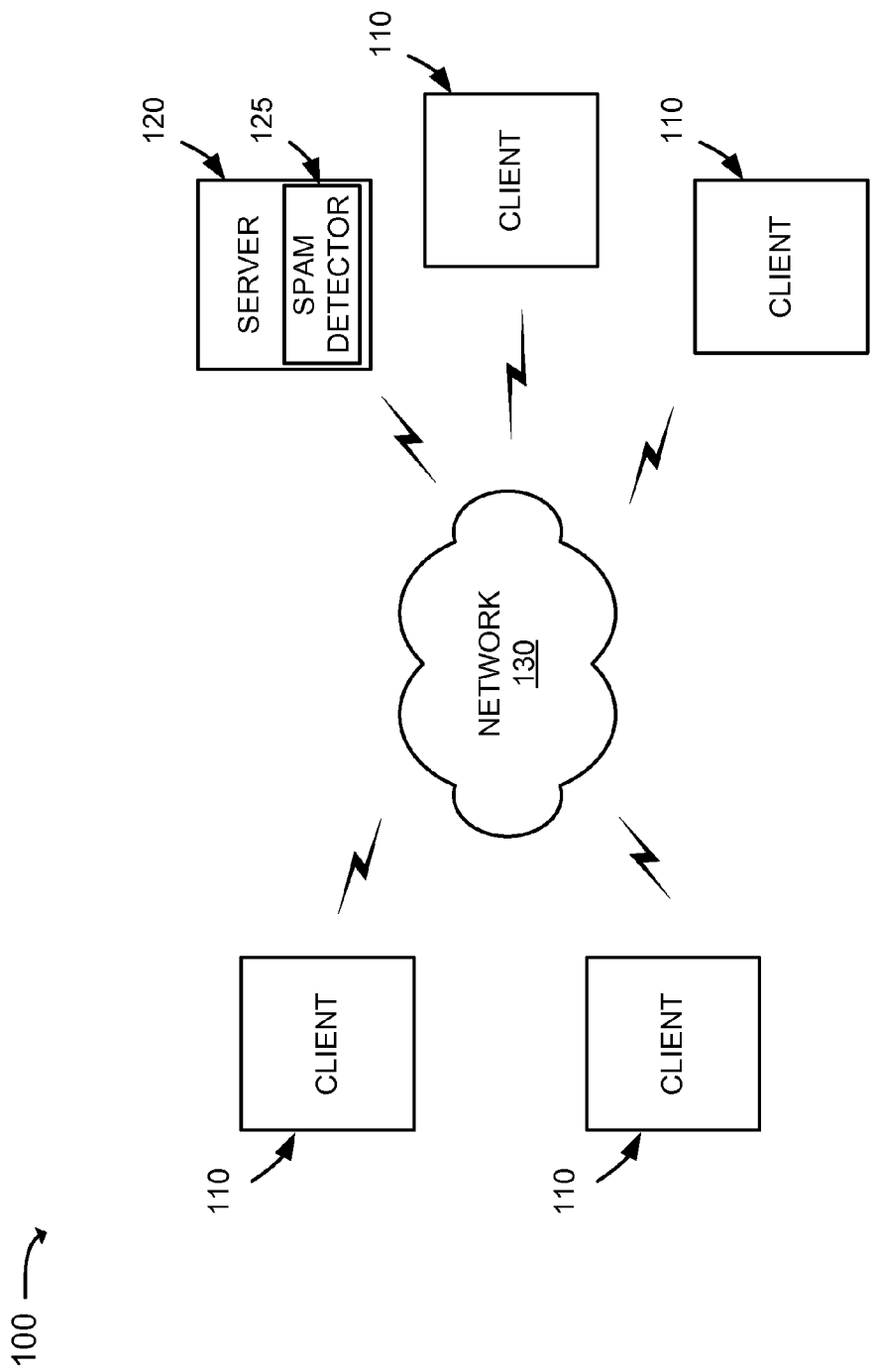
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to a server 120 via a network 130. Network 130 may include a local area network (LAN), a wide area network (WAN), a telephone network, such as the Public Switched Telephone Network (PSTN), an intranet, the Internet, a similar or dissimilar network, or a combination of networks. Four clients 110 and one server 120 have been illustrated as connected to network 130 in FIG. 1 for simplicity. In practice, there may be more or less clients 100 and servers 120. Also, in some instances, a client 110 may perform the functions of a server 120 and a server 120 may perform the functions of a client 110.

Clients 110 may include devices, such as wireless telephones, personal computers, personal digital assistants (PDAs), lap tops, etc., threads or processes running on these devices, and/or objects executable by these devices. Server 120 may include server devices, threads, and/or objects that operate upon, search, or maintain documents in a manner consistent with the present invention. Clients 110 and server 120 may connect to network 130 via wired, wireless, or optical connections.

In an implementation consistent with the principles of the invention, server 120 may include a click spam detector 125 that, as will be described in detail below, determines whether an advertisement associated with server 120 has been subjected to a click spam attack.

Exemplary Server Architecture

Figure 2:
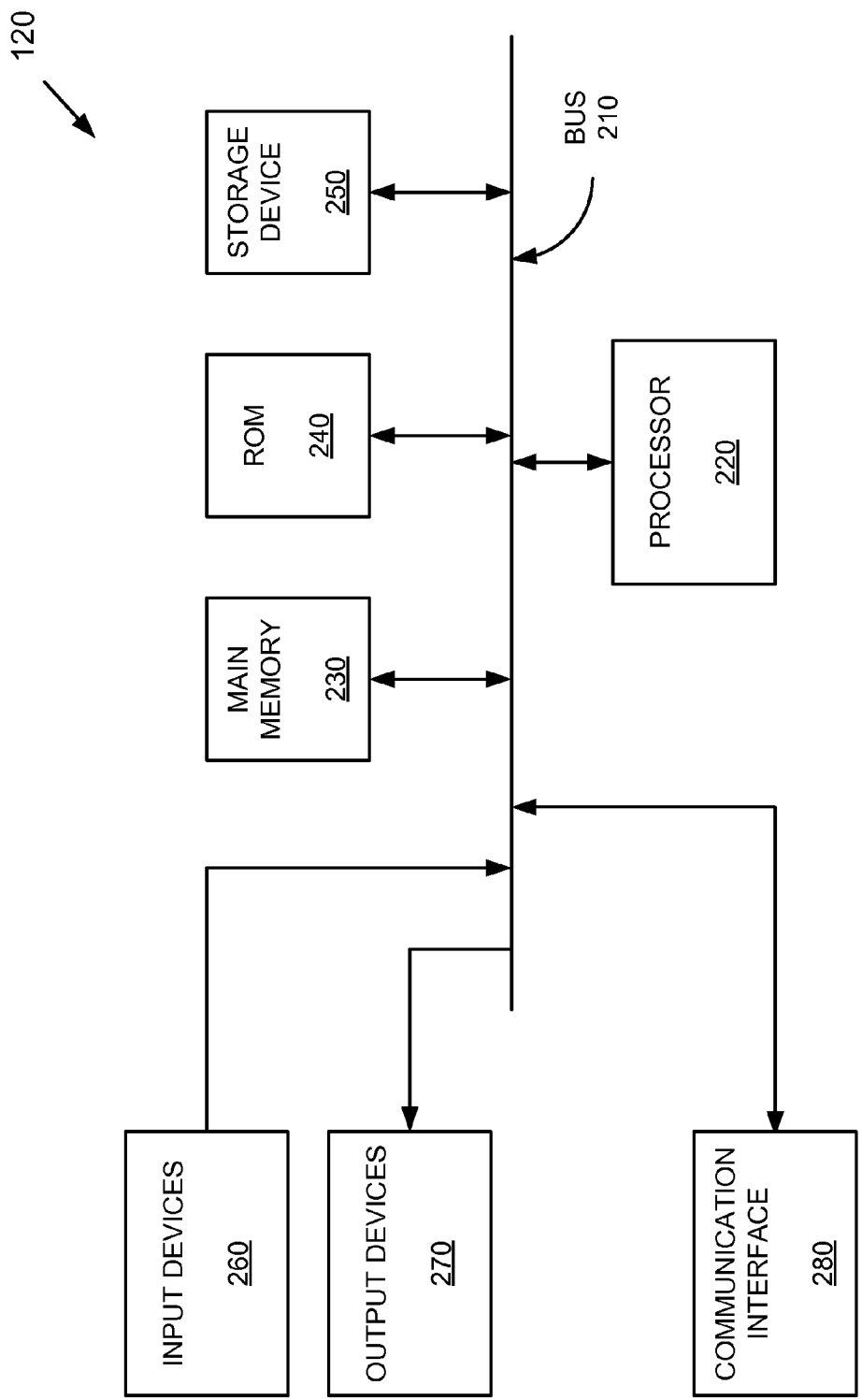
FIG. 2 is an exemplary diagram of the server of FIG. 1 in an implementation consistent with the principles of the invention.

FIG. 2 is an exemplary diagram of server 120 in an implementation consistent with the principles of the invention. Server 120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of server 120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input devices 260 may include one or more conventional mechanisms that permit a user to input information to server 120, such as a keyboard, a mouse, a pen, voice recognition and/or biometric mechanisms, etc. Output devices 270 may include one or more conventional mechanisms that output information to the user, including a display, a printer, a speaker, etc. Communication interface 280 may include any transceiver-like mechanism that enables server 120 to communicate with other devices and/or systems. For example, communication interface 280 may include mechanisms for communicating with another device or system via a network, such as network 130.

As will be described in detail below, server 120, consistent with the principles of the invention, may perform click spam detection operations. Server 120 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, the present invention is not limited to any specific combination of hardware circuitry and software.

Exemplary Processing

Figure 3:
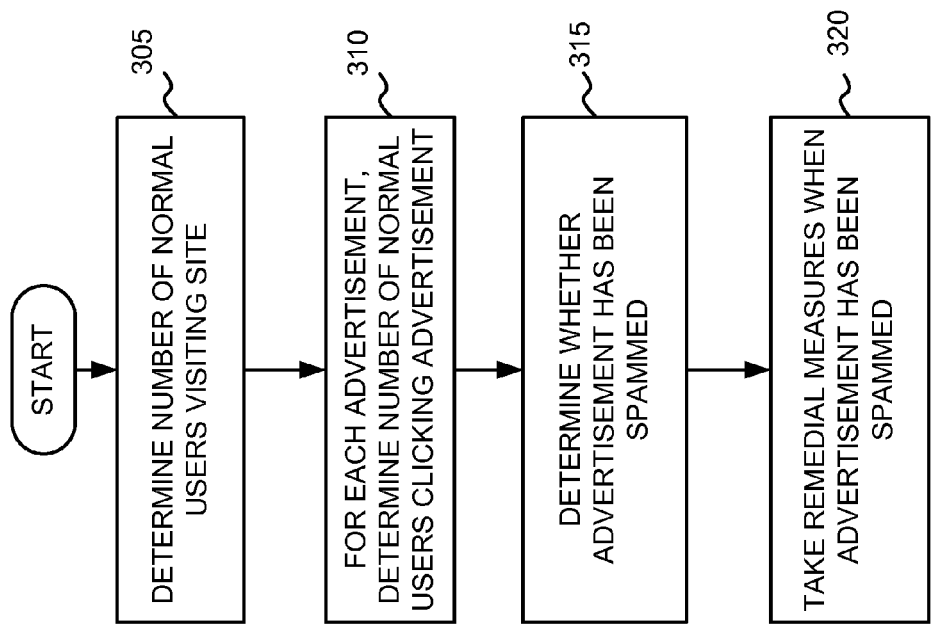
FIG. 3 is a flow chart of an exemplary process for detecting and handling click spam in an implementation consistent with the principles of the invention.

FIG. 3 is a flow chart of an exemplary process for detecting and handling click spam in an implementation consistent with the principles of the invention. The following description focuses on a server that provides searching functions. It will be appreciated that the techniques described herein are equally applicable to any server, whether local or remote, that provides advertisements for which fees are charged when the advertisements are selected by or presented to a user of a client device, such as client 110 in FIG. 1.

Processing may begin by determining the number of clients 110 accessing server 120 that are normal users (act 305). To identify normal users, server 120 may, for example, examine web query logs and determine a set of user cookies that are likely normal users that do regular searches. It will be appreciated that server 120 may store a cookie, which has, for example, a unique identifier, on client 110 the first time client 110 accesses server 120's web site and update that cookie on each return visit. Via this unique identifier, server 120 may then track how often a user of this particular client 110 visits server 120's web site and what the user does when visiting the site. Based on information from these cookies, server 120 may determine whether a client 110 is likely being used in a normal manner or being used for spamming. The age of the cookie associated with a particular client 110 may also be considered. For example, in one implementation, cookies associated with clients 110 that are less than some predetermined time period (e.g., one week old) may not be considered to be associated with normal users. Moreover, by cryptographically signing the cookies, some users can be readily identified as non-normal users.

Several factors may be considered in determining whether a particular client 110 is being used in a normal manner. For example, if client 110 loads images, this may be an indication that this particular client 110 is being used in a normal manner. Clients 110 that use programs to click spam an advertisement typically "click" the advertisement without downloading all of the images on a server's web site. Another factor that may be considered is whether javascript has been turned on for client 110. Typically, programs that perform click spamming are either a Perl script or a C program, so no javascript interpreter is present. Therefore, if a particular client 110 has javascript turned on, this may be an indication that this client 110 is being used in a normal manner. The type of browser that client 110 is using may also be considered when determining whether a particular client 110 is likely being used in a normal manner. Spamming programs do not typically use a browser to perform click spamming. Therefore, the fact that a particular client 110 is using a browser, such as Microsoft's Internet Explorer, may be an indication that this client 110 is being used in a normal manner.

Another factor that may be considered is the interval arrival time of a client 110. For example, if a client 110 visits server 120's web site an exorbitant number of times (e.g., 40 times) during a short time interval (e.g., 1 minute), this may be an indication that this client 110 is being used for spamming purposes. Similarly, if client 110 visits server 120's web site at periodic time intervals for some period of time (e.g., once every minute for three hours), this may be an indication that this client 110 is being used for spamming purposes. Therefore, if the interval arrival time of a particular client 110 is somewhat sporadic, this may be an indication that this client 110 is being used in a normal manner.

The types of searches that a client 110 performs may also be an indication of whether client 110 is being used in a normal manner or for spamming purposes. In some instances, spamming programs may perform searches in an ordered (e.g., alphabetic) manner. If searches performed by a client 110 are not in an ordered manner, this may be an indication that this client 110 is being used in a normal manner.

Once normal clients 110 have been determined, server 120 may store the cookie identifiers associated with these normal clients 110 in memory, such as main memory 230 (FIG. 2). Server 120 may also determine the proportion of clients 110 accessing server 120 that are normal users by, for example, comparing the number of normal clients 110 to the total number of clients 110 accessing server 120 over some period of time.

Server 120 may determine, for each advertisement, the number of normal users clicking (or selecting) the advertisement (act 310). In one implementation consistent with the principles of the invention, the proportion of clicks coming from normal users during a given time period can be set to approximately equal the proportion of normal users accessing server 120's web site during that given time period. For example, if server 120 identifies that 20% of clients 110 accessing server 120's web site over a given time period are being used in a normal manner, then server 120 can assume that about 20% (plus or minus some variation) of the clicks for a particular advertisement would be from these normal users. If the actual percentage of normal users clicking the advertisement is significantly lower than the assumed value, then server 120 may determine that this advertisement has been spammed. For example, if the actual percentage of normal users clicking the advertisement drops from 20% to 1%, server 120 may determine that this advertisement is being spammed.

In alternative implementations consistent with the principles of the invention, server 120 may retrieve the set of cookie identifiers associated with normal clients 110 (or users) stored in memory 230 and may monitor the activity of the users associated with these cookie identifiers. Server 120 may determine the percentage of these normal users that click a particular advertisement. By comparing this percentage to the actual number of clicks that the advertisement actually gets, server 120 can determine whether the advertisement is being spammed.

Figure 4:
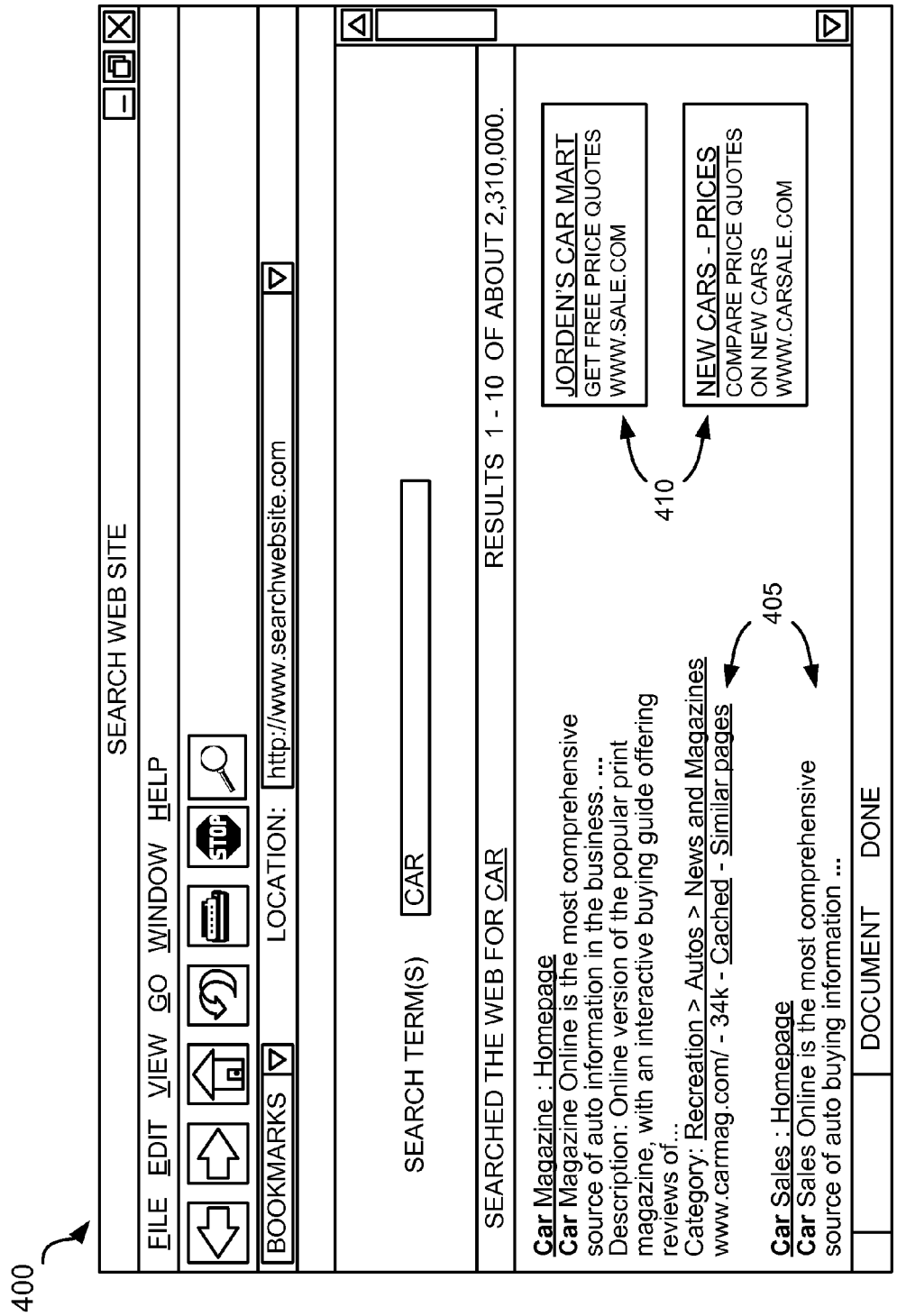
FIG. 4 is a diagram of an exemplary web site in an implementation consistent with the principles of the invention.

As an example, consider the exemplary web page 400 illustrated in FIG. 4. As illustrated, in response to a search for "car," server 120's web site 400 provides a list of car-related web sites 405, and also provides one or more car advertisements 410. Assume that server 120 determines that the set of normal users has a 5% click rate (i.e., the percentage of normal users clicking that advertisement) on Jorden's Car Mart advertisement 410. If the overall click rate is 20%, server 120 may determine that Jorden's Car Mart advertisement 410 is being spammed.

It will be appreciated that the frequency of an advertisement's impressions or its click rate may change over time. For example, certain types of advertisements, such as advertisements for purchasing flowers on-line, are more likely to be clicked during the day than at night because people are much more likely to purchase flowers during the day than at night. Moreover, certain advertisements may be less likely to be clicked during certain days of the week or months of the year. For example, it may be determined that users are less likely to shop for a particular good or service on the weekends. Therefore, users may be less likely to click on advertisements for that good or service during that time period.

Server 120 may take these factors into consideration when determining whether a particular advertisement has been spammed. For instance, server 120 may determine that the normal user click rate for an advertisement for flowers is 5% during the day and 1% at night. Server 120 may also, for example, determine that the normal user click rate for an advertisement for Halloween items is 10% during the month of October, but only 1% during the other months of the year.

Server 120 may determine whether a particular advertisement has been spammed based at least in part on the number of normal users clicking that advertisement (act 315). As set forth above, server 120 may, for example, identify that 20% of clients 110 accessing server 120's web site over a given time period are being using in a normal manner. Server 120 may then assume that about 20% (plus or minus some variation) of the clicks for a particular advertisement would be from these normal users. If the actual percentage of normal users clicking the advertisement drops, for example, from 20% to 1%, server 120 may determine that this advertisement is being spammed.

Alternatively, server 120 may compare the number of clicks on a particular advertisement from normal users to the actual number of clicks on that advertisement. Based on this comparison, server 120 can determine whether the advertisement is being spammed. For example, if a particular advertisement has a normal user click rate of 5% and the overall click rate for that advertisement is 30%, server 120 may determine that the advertisement has been spammed.

Once server 120 determines that an advertisement has been spammed, remedial measures may be taken (act 320). For example, a refund may be given to a company associated with an advertisement that has been spammed. In one implementation consistent with the principles of the invention, server 120 may store an overall click rate threshold value for an advertisement in, for example, memory 230. This click rate threshold may be a multiple of the normal user click rate (e.g., four times, ten times, etc.) for that particular advertisement. If the overall click rate for a particular advertisement exceeds the overall click rate threshold, a refund may be given to the company associated with the advertisement.

Alternatively, companies may be charged on a per impression basis instead of on a per click basis. In this situation, if server 120 determines, for example, that an advertisement has been spammed, by causing the advertisement to be displayed an exorbitant number of times, the company associated with the spammed advertisement may be given free impressions instead of a refund. For example, if server 120 determines that 400 of an advertisement's impressions are a result of spamming, then the company associated with the advertisement may be given 400 free impressions.

Once a spammed advertisement has been identified, a number of off-line or manual techniques may be implemented to improve spam detection and/or prevention. For example, Internet Protocol (IP) addresses of spamming clients 110 may be determined by examining web logs for those advertisements that have been spammed. If a particular IP address or a set of IP addresses shows up a particular number of times for an advertisement or in a number of spammed advertisements, that IP address (or set of addresses) may be associated with a spamming client(s) 110. By storing a set of potentially malicious IP addresses, server 120 can block or ignore these addresses when determining the amount to charge advertising companies.

Moreover, more in depth analysis of spammed advertisements can be made. For example, if the advertisements displayed as a result of a search for brown widgets are being spammed, the web logs associated with those advertisements can be analyzed to determine from where the clicks originated. In this manner, a more in depth analysis can be performed to try and determine why this spamming is occurring.

CONCLUSION

Implementations consistent with the principles of the invention detect the spamming of advertisements on a web site by analyzing the behavior of normal users visiting the web site. In this way, the number of queries that need to be considered in performing spam intervention can be significantly reduced.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above-description focused on the spamming of advertisements, implementations consistent with the principles of the invention are not so limited. In fact, implementations consistent with the principles of the invention are equally applicable to any environment (e.g., on-line voting) in which an accurate measure of the number of clicks that a displayed item receives from normal users is desired.

While a series of acts has been described with regard to FIG. 3, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method performed by one or more server devices, the method comprising: tracking, by at least one of the one or more server devices, activities of devices that access a web site, identifying, based on the tracked activities and by at least one of the one or more server devices, a particular set of devices from among the devices accessing the web site; determining, by at least one of the one or more server devices, whether a link, associated with the web site, has been spammed, where the determining includes: comparing an actual click rate of the link to an expected click rate of the link by the particular set of devices, where the expected click rate is based on historical data associated with the link, and determining, based on the comparing, that the link has been spammed when the actual click rate is greater than the expected click rate; and taking, by at least one of the one or more devices, a remedial measure upon determining that the link has been spammed.

2. The method of claim 1, where tracking an activity of a particular device of the devices includes determining whether the particular device loads images.

3. The method of claim 1, where tracking an activity of a particular device of the devices includes determining an age of a cookie associated with the particular device.

4. The method of claim 1, where tracking an activity of a particular device of the devices includes determining whether the particular device has javascript enabled.

5. The method of claim 1, where tracking an activity of a particular device of the devices includes determining a type of browser used by the particular device to access the web site.

6. The method of claim 1, where tracking an activity of a particular device of the devices includes determining an interval at which the particular device accesses the web site.

7. The method of claim 1, where the link is an advertising link, where a fee is charged to an advertiser associated with the advertising link when the advertising link is selected.

8. The method of claim 1, where identifying the particular set of devices includes identifying that the particular set of devices meet one or more factors associated with normal activity, where the historical data indicates a past percentage of selections of the link by devices that meet the one or more factors associated with normal activity.

9. The method of claim 8, further comprising: setting the expected click rate equal to the past percentage of selections of the link by the devices that meet the one or more factors.

10. A method performed by one or more server devices, the method comprising: identifying, based on information associated with a plurality of visitors visiting a web site, and by at least one of the one or more server devices, a set of non-malicious visitors, out of the plurality of visitors; determining, by at least one of the one or more server devices, an estimated click rate of a link associated with the web site, the estimated click rate being equal to a proportion of a quantity of the non-malicious visitors visiting the web site to a total quantity of the plurality of visitors visiting the web site; identifying, by at least one of the one or more server devices, an actual click rate of the link by the non-malicious visitors, the actual click rate being equal to a proportion of a quantity of selections of the link by the non-malicious visitors to a total quantity of selections of the link by the plurality of visitors; comparing, by at least one of the one or more server devices, the determined estimated click rate to the identified actual click rate of the link by the non-malicious visitors; detecting, by at least one of the one or more server devices, that spamming has occurred when the determined estimated click rate is greater than the identified actual click rate of the link by the non-malicious visitors; and taking, by at least one of the one or more server devices, a remedial measure when the occurrence of spamming is detected.

11. The method of claim 10, where the information associated with a particular visitor of the plurality of visitors includes determining a type of browser used by the particular visitor to access the web site.

12. The method of claim 10, where the information associated with a particular visitor of the plurality of visitors includes whether the particular visitor loads images.

13. The method of claim 10, where the information associated with a particular visitor of the plurality of visitors includes an interval at which the particular visitor accesses the web site.

14. The method of claim 10, where the information associated with a particular visitor of the plurality of visitors includes an age of a cookie associated with the particular visitor.

15. The method of claim 10, where the information associated with a particular visitor of the plurality of visitors includes whether the particular visitor has javascript enabled.

16. A non-transitory computer-readable memory device storing instructions, the instructions comprising:
  one or more instructions which, when executed by one or more processors, cause the one or more processors to track activities of devices that access a web site;
  one or more instructions which, when executed by the one or more processors, cause the one or more processors to identify, based on the tracked activities, a particular set of devices, from among the devices accessing the web site;
  one or more instructions which, when executed by the one or more processors, cause the one or more processors to determine whether a link, associated with the web site, has been spammed, where the one or more instructions to determine whether the link has been spammed include:
  one or more instructions which, when executed by the one or more processors, cause the one or more processors to compare an actual click rate of the link to an expected click rate of the link by the particular set of devices, where the expected click rate is based on historical data associated with the link, and
  one or more instructions which, when executed by the one or more processors, cause the one or more processors to determine, based on the comparing, that the link has been spammed when the actual click rate is greater than the expected click rate; and
  one or more instructions which, when executed by the one or more processors, cause the one or more processors to take a remedial measure upon determining that the link has been spammed.

17. The non-transitory computer-readable memory device of claim 16, where the one or more instructions to track an activity of a particular device of the devices include one or more instructions which, when executed by the one or more processors, cause the one or more processors to determine whether the particular device loads images.

18. The non-transitory computer-readable memory device of claim 16, where the one or more instructions to track an activity of a particular device of the devices include one or more instructions which, when executed by the one or more processors, cause the one or more processors to determine an age of a cookie associated with the particular device.

19. The non-transitory computer-readable memory device of claim 16, where the one or more instructions to track an activity of a particular device of the devices include one or more instructions which, when executed by the one or more processors, cause the one or more processors to determine whether the particular device has javascript enabled.

20. The non-transitory computer-readable memory device of claim 16, where the one or more instructions to track an activity of a particular device of the devices include one or more instructions which, when executed by the one or more processors, cause the one or more processors to determine a type of browser used by the particular device to access the web site.

* * * * *